United States Patent
Hill

(10) Patent No.: US 10,426,139 B1
(45) Date of Patent: Oct. 1, 2019

(54) PET GROOMING ENCLOSURE

(71) Applicant: Marilyn Hill, Corrales, NM (US)

(72) Inventor: Marilyn Hill, Corrales, NM (US)

( * ) Notice: Subject to any disclaimer, the term of this patent is extended or adjusted under 35 U.S.C. 154(b) by 357 days.

(21) Appl. No.: 15/376,735

(22) Filed: Dec. 13, 2016

(51) Int. Cl.
*A01K 13/00* (2006.01)
*B08B 5/04* (2006.01)

(52) U.S. Cl.
CPC ............. *A01K 13/001* (2013.01); *B08B 5/04* (2013.01)

(58) Field of Classification Search
CPC ........ A01K 13/00; A01K 13/001; A01K 1/00; A01K 1/0047; A01K 1/0114
See application file for complete search history.

(56) References Cited

U.S. PATENT DOCUMENTS

| | | | | |
|---|---|---|---|---|
| 3,884,191 A | * | 5/1975 | Stout | A01K 13/001 119/671 |
| 4,729,147 A | | 3/1988 | Armbruster | |
| 5,243,931 A | * | 9/1993 | McDonough | A01K 27/002 119/671 |
| 5,513,598 A | | 5/1996 | Zapparoli | |
| 5,655,478 A | * | 8/1997 | Kiera | A01K 1/0107 119/165 |
| 5,806,461 A | * | 9/1998 | Kiera | A01K 1/0107 119/165 |
| D444,924 S | | 7/2001 | Henning | |
| 7,011,046 B1 | * | 3/2006 | Kidwell | A01K 1/0047 119/657 |
| 7,107,937 B1 | * | 9/2006 | Anderson | A01K 13/001 119/665 |
| 8,069,821 B1 | * | 12/2011 | Green | A01K 13/001 119/671 |
| 9,220,237 B1 | | 12/2015 | Dryden | |
| 9,565,830 B1 | * | 2/2017 | Caico | A01K 1/0114 |
| 2007/0039559 A1 | * | 2/2007 | Foster | A01K 13/001 119/676 |
| 2007/0245975 A1 | | 10/2007 | Udelle | |
| 2008/0053379 A1 | | 3/2008 | Marewitz | |
| 2008/0190375 A1 | * | 8/2008 | German | A01K 13/001 119/606 |
| 2010/0005616 A1 | | 1/2010 | Grissom | |
| 2012/0118244 A1 | * | 5/2012 | Finch | A01K 13/001 119/600 |

(Continued)

FOREIGN PATENT DOCUMENTS

| | | | | |
|---|---|---|---|---|
| CA | 2707181 A1 | * | 3/2011 | ........... A01K 13/001 |
| CA | 2916250 A1 | * | 12/2014 | ........... A01K 13/003 |

*Primary Examiner* — Monica L Williams
*Assistant Examiner* — Aaron M Rodziwicz

(57) ABSTRACT

The pet grooming enclosure resembles an animal carrier that includes a plurality of suction nozzles located within an interior of the animal carrier. The plurality of suction nozzles collectively connects to a manifold that is connected to a vacuum and motor. The plurality of suction nozzles is adapted to draw out moisture and loose hair or fur from within the animal carrier, but without actually coming into contact with an animal positioned within the animal carrier. The animal carrier includes a sliding tray that is presented along the bottom of the animal carrier. In use, the sliding tray is positioned inside of the animal carrier such that an animal is adaptively positioned on the sliding tray. The sliding tray is adapted to collect water and debris from within the animal carrier, and subsequently slide out of the animal carrier in order to discard the water and debris.

13 Claims, 5 Drawing Sheets

(56) References Cited

U.S. PATENT DOCUMENTS

| | | | |
|---|---|---|---|
| 2012/0312246 A1* | 12/2012 | Doumas | A01K 13/001 119/606 |
| 2013/0055962 A1* | 3/2013 | Scoggins | A01K 13/001 119/453 |
| 2013/0125830 A1* | 5/2013 | Denning | A01K 13/001 119/651 |
| 2015/0059658 A1* | 3/2015 | Whitsett | A01K 13/001 119/671 |
| 2015/0366163 A1* | 12/2015 | Carter | A01K 13/001 119/678 |
| 2016/0128302 A1* | 5/2016 | Stauber | A01K 13/001 119/671 |
| 2017/0094939 A1* | 4/2017 | Wright | A01K 13/001 |
| 2017/0099805 A1* | 4/2017 | Arab | A01K 1/0245 |
| 2018/0206449 A1* | 7/2018 | Zhang | A01K 13/001 |

\* cited by examiner

PET GROOMING ENCLOSURE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of pet grooming systems, more specifically, a pet enclosure that is specially adapted for use in grooming an enclosed pet.

SUMMARY OF INVENTION

The pet grooming enclosure resembles an animal carrier that includes a plurality of suction nozzles located within an interior of the animal carrier. The plurality of suction nozzles collectively connects to a manifold that is connected to a vacuum and motor. The plurality of suction nozzles is adapted to draw out moisture and loose hair or fur from within the animal carrier, but without actually coming into contact with an animal positioned within the animal carrier. The animal carrier includes a sliding tray that is presented along the bottom of the animal carrier. In use, the sliding tray is positioned inside of the animal carrier such that an animal is adaptively positioned on the sliding tray. The sliding tray is adapted to collect water and debris from within the animal carrier, and subsequently slide out of the animal carrier in order to discard the water and debris. The animal carrier includes a door that locks and unlocks in order to provide ingress into and egress from the interior of the animal carrier. The animal carrier includes at least one handle that is used to carry the animal carrier.

It is an object of the invention to provide a pet grooming enclosure that is responsible for drying off a wet animal from a bath.

A further object of the invention is for the pet grooming enclosure to suction out water and loose debris from within the enclosure whilst the animal is positioned within the pet grooming enclosure.

These together with additional objects, features and advantages of the pet grooming enclosure will be readily apparent to those of ordinary skill in the art upon reading the following detailed description of the presently preferred, but nonetheless illustrative, embodiments when taken in conjunction with the accompanying drawings.

In this respect, before explaining the current embodiments of the pet grooming enclosure in detail, it is to be understood that the pet grooming enclosure is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pet grooming enclosure.

It is therefore important that the claims be regarded as including such equivalent construction insofar as they do not depart from the spirit and scope of the pet grooming enclosure. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
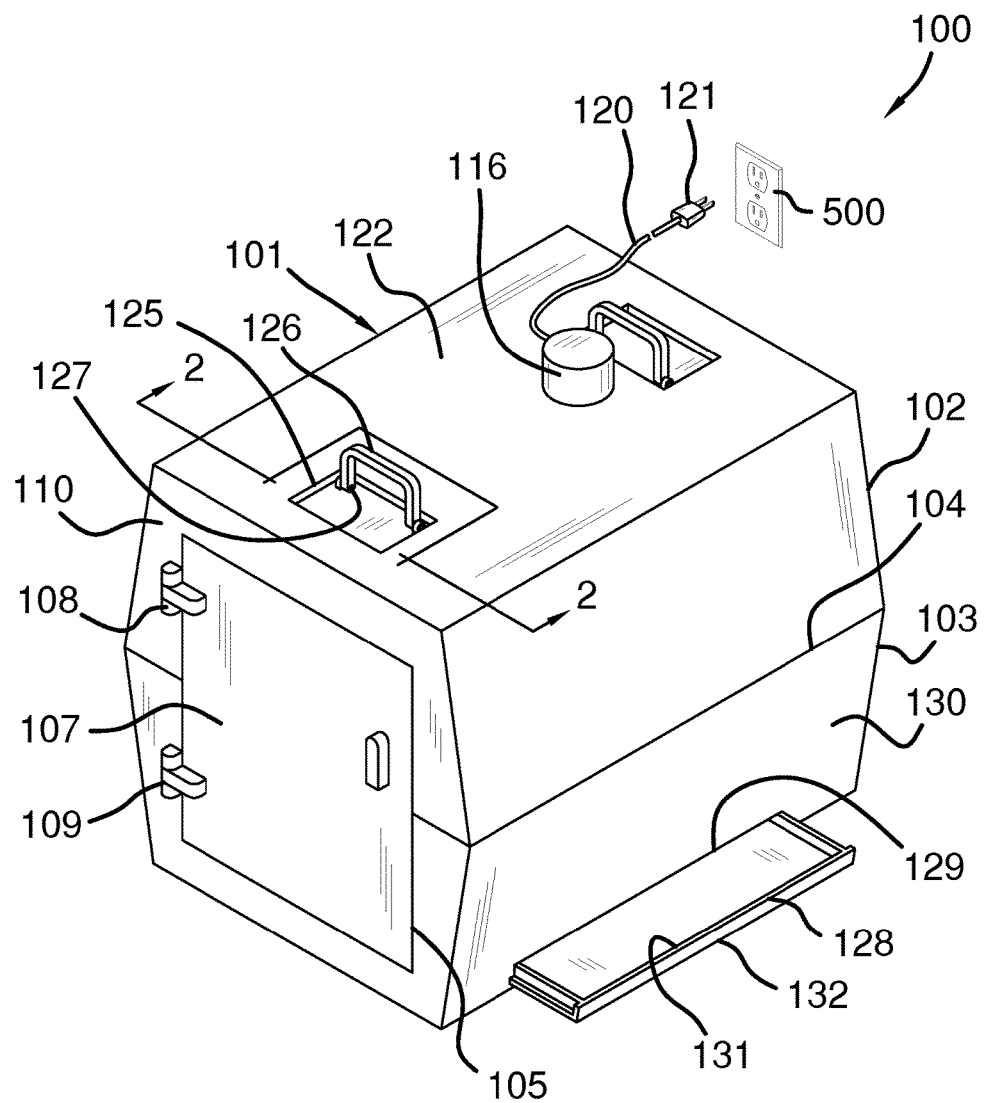
FIG. 1 is a perspective view of an embodiment of the disclosure.
Figure 2:
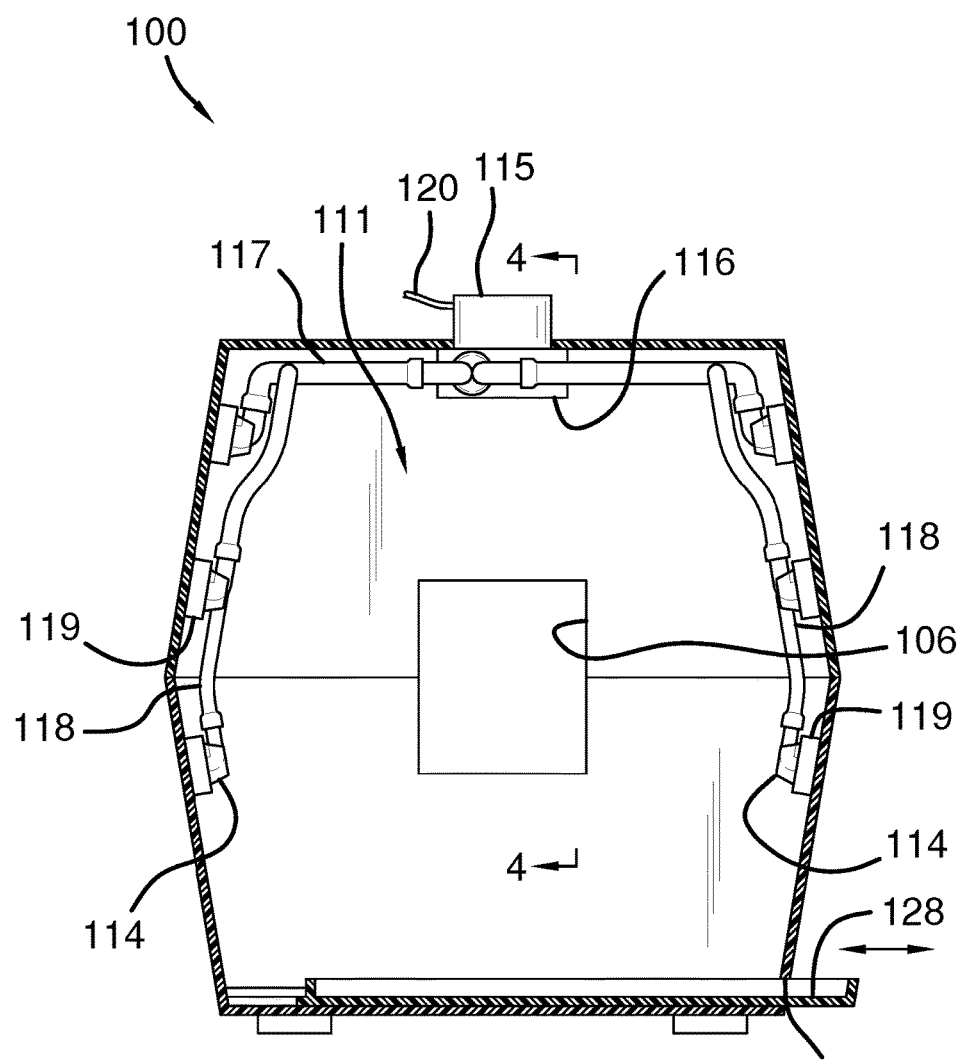
FIG. 2 is a cross-sectional view of an embodiment of the disclosure across line 2-2 as shown in FIG. 1.
Figure 3:
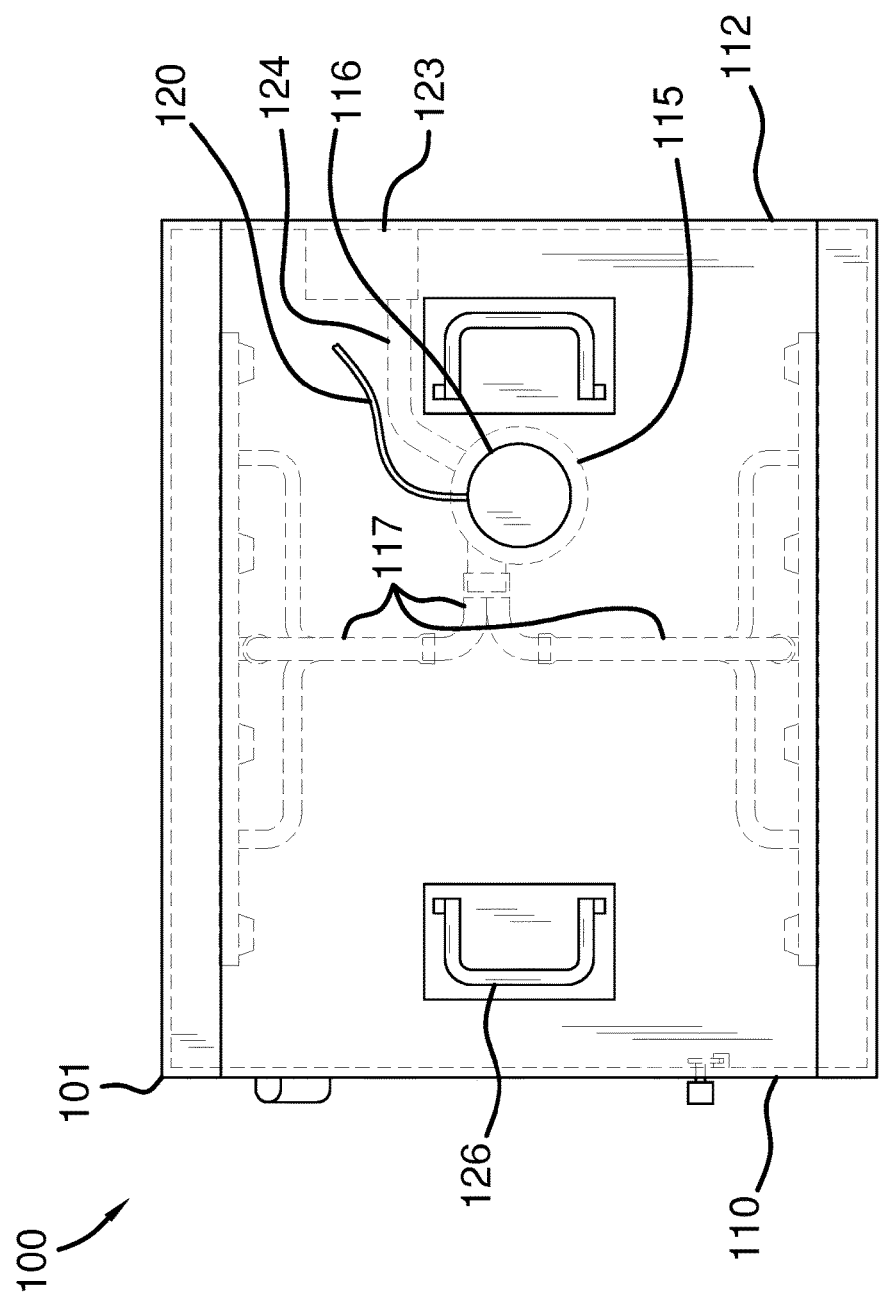
FIG. 3 is a top view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The pet grooming enclosure 100 (hereinafter invention) comprises an enclosure 101 that is further defined with a top portion 102 and a bottom portion 103. The top portion 102 is affixed to and is seated onto the bottom portion 103 along a perimeter edge 104. The enclosure 101 includes a first opening 105 and a second opening 106.

The first opening 105 includes a door 107 that is attached to both the top portion 102 and the bottom portion 103. The door 107 pivots with respect to the enclosure 101 via a top hinge 108 and a bottom hinge 109. The top hinge 108 connects to both the door 107 and the top portion 102. The bottom hinge 109 connects to both the door 107 and the bottom portion 103. The first opening 105 is provided on a front surface 110 of the enclosure 101. The door 107 provides access to an interior 111 of the enclosure 101.

The second opening 106 is provided on a rear surface 112 of the enclosure 101. The rear surface 112 is distal of the front surface 110. Moreover, the rear surface 112 and the front surface 110 are separated from one another via an enclosure length 113. The enclosure 101 is adapted to receive an animal 200 within the interior 111. Moreover, the second opening 106 is optionally adapted to receive at least part of an animal head 201 there through.

The enclosure 101 includes a plurality of vacuum nozzles 114. The plurality of vacuum nozzles 114 are strategically located throughout the interior 111 of the enclosure 101. Moreover, the plurality of vacuum nozzles 114 are each in fluid connection with a vacuum 115. The vacuum 115 is connected to a motor 116. Motor 116 operates the vacuum 115. The vacuum 115 is responsible for providing suction that is adapted to remove water and/or debris 300 from the interior 111 of the enclosure 101. It shall be noted that the term water and/or debris 300 is being used to refer to any matter that is drawn from the animal 300, and is likely to include dirt, dander, hair or fur, water, etc. It is envisioned that the invention 100 is used to suck out water and loose fur or hair from the animal 200 after the animal 200 has had a bath. The invention 100 is being primarily used to dry off the coat of fur or hair of the animal 200 after having said bath.

A vacuum manifold 117 is attached to the vacuum 115. The vacuum manifold 117 enables a plurality of suction conduits 118 to extend along the interior 111 of the enclosure 101. Each of the plurality of suction conduits 118 is attached to one of a plurality of horizontal suction manifolds 119. Each of the plurality of horizontal suction manifolds 119 is connected to at least one of the plurality of vacuum nozzles 114.

The motor 116 is positioned above the vacuum 115. The motor 116 includes wiring 120 that extends from the motor 116. The wiring 120 is terminated with a plug 121 that is adapted to be connected to an electrical source 500. The motor 116 is visible from above the enclosure 101. In fact, the motor 116 is located above a top surface 122 of the enclosure 101. The vacuum 115 is located within the interior 111 of the enclosure 101. The vacuum 115 is driven via the motor 116. The vacuum 115 includes an impeller (not shown) that creates a pressure drop in order to form a suction at the plurality of vacuum nozzles 114. Water and/or debris 300 is collected at the plurality of vacuum nozzles 114, and is diverted to the respective one of the plurality of suction conduits 118 via a relative one of the plurality of horizontal suction manifolds 119. The water and/or debris 300 is transferred from the vacuum 115 over to a receptacle 123 via a receptacle conduit 124.

Integrated into the top surface 122 of the enclosure 101 is at least one handle recess 125. The at least one handle recess 125 accommodates at least one handle 126. The at least one handle 126 rotates via a handle pin 127. The at least one handle 126 can rotate from a flat orientation to a vertical orientation.

The enclosure 101 includes a sliding tray 128. The sliding tray 128 extends in an out of a tray slot 129 provided on a side surface 130 of the enclosure 101. The tray slot 129 is located on the bottom portion 103 of the enclosure 101. The sliding tray 128 is adapted to enable the animal 200 to lie thereon when the invention 100 is in use. Moreover, once the animal 200 has exited the enclosure 101, the sliding tray 128 is able to slide outwardly in order for the water and/or debris 300 that has collected thereon to be removed. The sliding tray 128 features at least one lip 131 along a tray perimeter edge 132 of the sliding tray 128.

Figure 4:
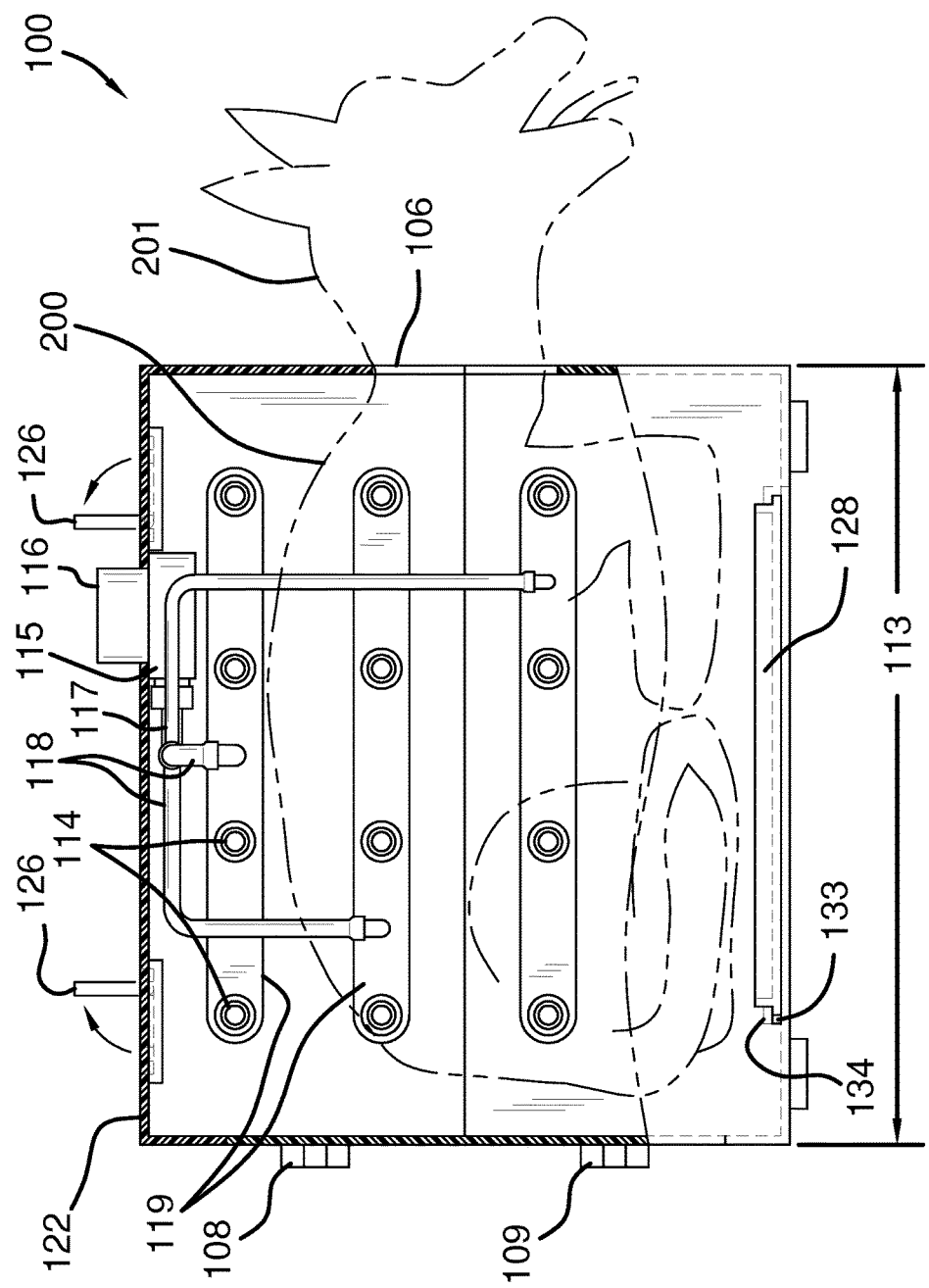
FIG. 4 is a cross-sectional view of an embodiment of the disclosure across line 4-4 as shown in FIG. 2.
Figure 5:
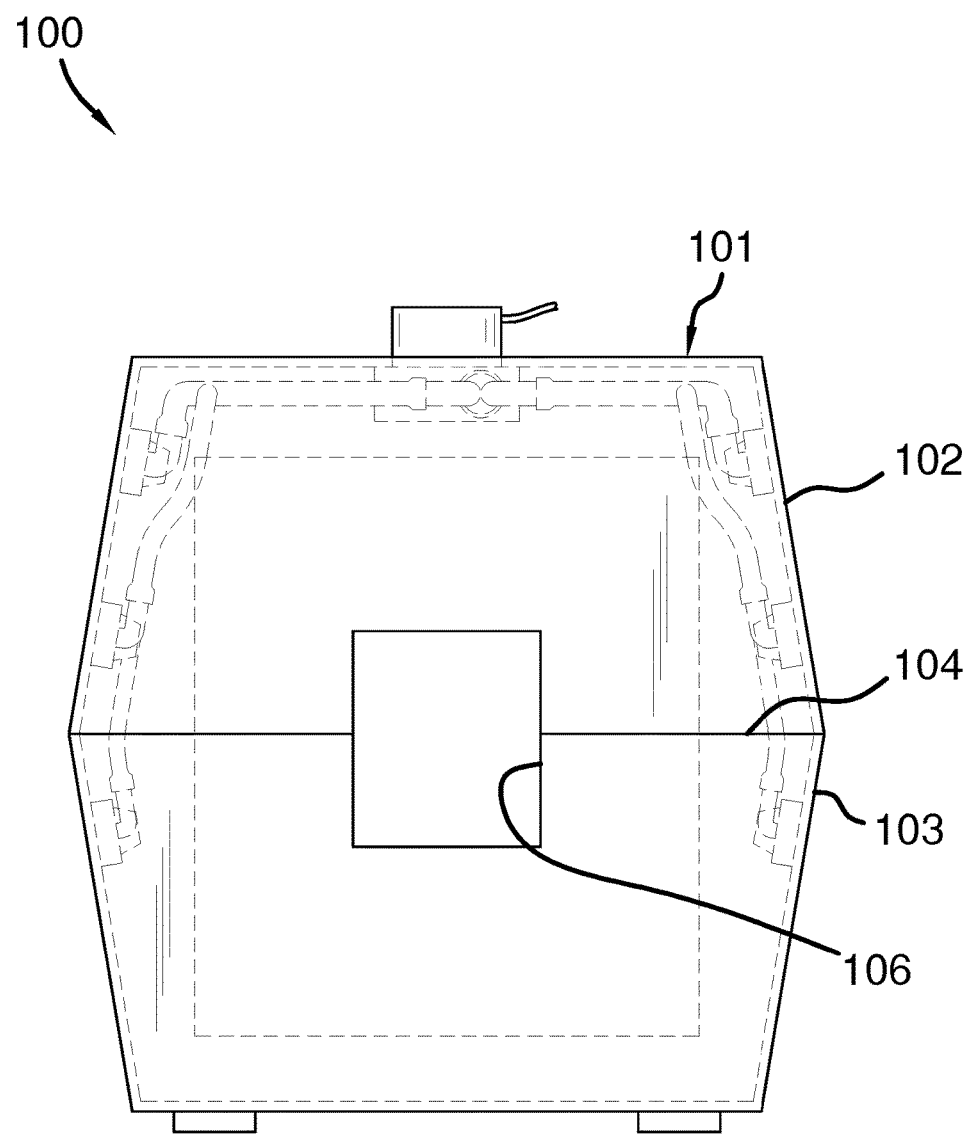
FIG. 5 is a rear view of an embodiment of the disclosure.

Referring to FIG. 4, the sliding tray 128 includes a rail 133 that slides on a track 134 integrated into the enclosure 101. The track 134 of the enclosure enables the rail 13 of the sliding tray 128 to move back and forth relative to the enclosure 101.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An accessory for grooming an animal comprising:
an enclosure that is adapted to receive an animal;
wherein said enclosure includes a plurality of suction nozzles that are adapted to collect water and debris from said animal;
wherein the enclosure is further defined with a top portion and a bottom portion;
wherein the top portion is affixed to and is seated onto the bottom portion along a perimeter edge;
wherein the enclosure includes a first opening and a second opening;
wherein the first opening includes a door that is attached to both the top portion and the bottom portion;
wherein the door pivots with respect to the enclosure via a top hinge and a bottom hinge;
wherein the top hinge connects to both the door and the top portion;
wherein the bottom hinge connects to both the door and the bottom portion;
wherein the first opening is provided on a front surface of the enclosure;
wherein the door provides access to an interior of the enclosure;
wherein the second opening is provided on a rear surface of the enclosure;
wherein the rear surface is distal of the front surface;
wherein the rear surface and the front surface are separated from one another via an enclosure length;
wherein the enclosure is adapted to receive said animal within the interior;
wherein the enclosure includes the plurality of vacuum nozzles within the interior of the enclosure;
wherein the plurality of vacuum nozzles are strategically located throughout the interior of the enclosure in order to adaptively remove water and debris from said animal.

2. The enclosure according to claim 1 wherein the second opening is optionally adapted to receive at least part of an animal head there through.

3. The enclosure according to claim 1 wherein the plurality of vacuum nozzles are each in fluid connection with a vacuum; wherein the vacuum is connected to a motor; wherein the motor operates the vacuum; wherein the vacuum is responsible for providing suction that is adapted to remove water and/or debris from the interior of the enclosure.

4. The enclosure according to claim 3 wherein a vacuum manifold is attached to the vacuum; wherein the vacuum manifold enables a plurality of suction conduits to extend along the interior of the enclosure.

5. The enclosure according to claim 4 wherein each of the plurality of suction conduits is attached to one of a plurality of horizontal suction manifolds.

6. The enclosure according to claim 5 wherein each of the plurality of horizontal suction manifolds is connected to at least one of the plurality of vacuum nozzles.

7. The enclosure according to claim 6 wherein the motor is positioned above the vacuum; wherein the motor includes wiring that extends from the motor; wherein the wiring is terminated with a plug that is adapted to be connected to an electrical source.

8. The enclosure according to claim 7 wherein the motor is visible from above the enclosure; wherein the motor is located above a top surface of the enclosure; wherein the vacuum is located within the interior of the enclosure; wherein the vacuum creates a pressure drop in order to form a suction at the plurality of vacuum nozzles; wherein the water and debris is collected at the plurality of vacuum nozzles, and is diverted to the respective one of the plurality of suction conduits via a relative one of the plurality of horizontal suction manifolds; wherein the water and debris is transferred from the vacuum over to a receptacle via a receptacle conduit.

9. The enclosure according to claim 8 wherein the top surface of the enclosure includes at least one handle recess; wherein the at least one handle recess accommodates at least one handle; wherein the at least one handle rotates via a handle pin; wherein the at least one handle can rotate from a flat orientation for non use or to a vertical orientation where the at least one handle is grasped in order to carry the enclosure.

10. The enclosure according to claim 9 wherein the enclosure includes a sliding tray; wherein the sliding tray extends in and out of a tray slot provided on a side surface of the enclosure.

11. The enclosure according to claim 10 wherein the tray slot is located on the bottom portion of the enclosure; wherein the sliding tray is adapted to enable the animal to lie thereon when inside the interior of the enclosure; wherein once the animal has exited the enclosure, the sliding tray is able to slide outwardly in order for the water and debris that is collected thereon to be removed.

12. The enclosure according to claim 11 wherein the sliding tray includes at least one lip along a tray perimeter edge of the sliding tray.

13. The enclosure according to claim 12 wherein the sliding tray includes a rail that slides on a track integrated into the enclosure; wherein the track of the enclosure enables the rail of the sliding tray to move back and forth relative to the enclosure.

\* \* \* \* \*